M. BARSCHALL.
RAIL JOINT.
APPLICATION FILED FEB. 15, 1906.
942,127.
Patented Dec. 7, 1909.
2 SHEETS—SHEET 1.
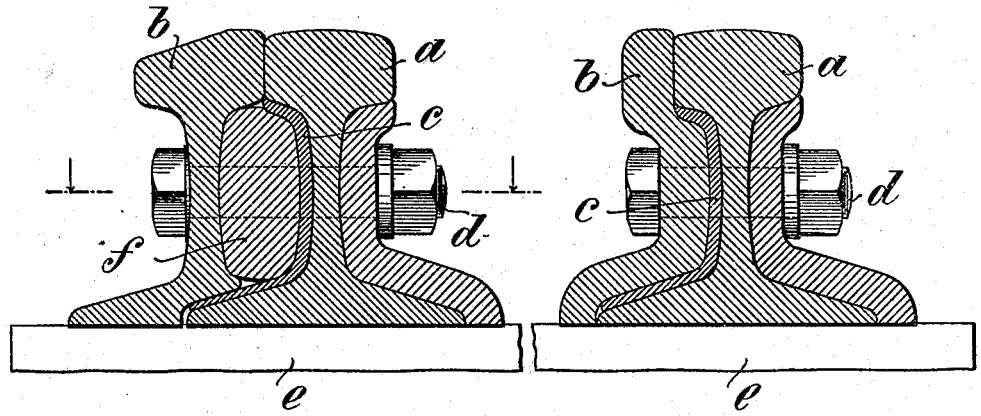
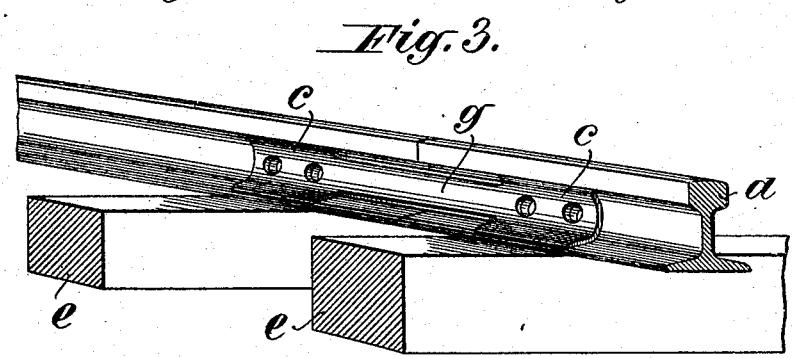
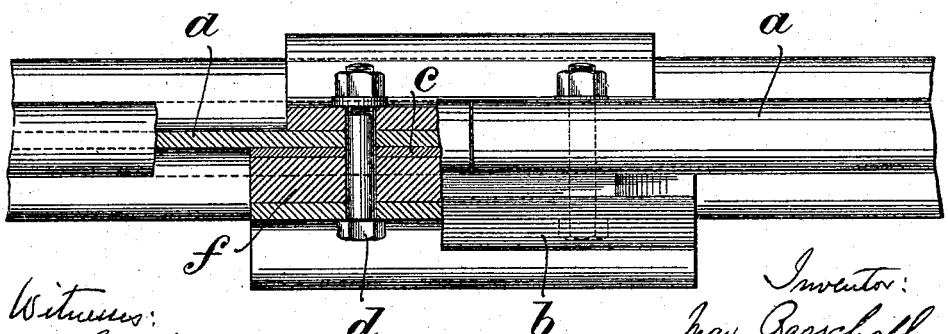
Inventor:
Max Barschall,
By Knight Bros
Associate Attorneys.

M. BARSCHALL.
RAIL JOINT.
APPLICATION FILED FEB. 15, 1906.

942,127.

Patented Dec. 7, 1909.
2 SHEETS—SHEET 2.

UNITED STATES PATENT OFFICE.

MAX BARSCHALL, OF NEW YORK, N. Y.

RAIL-JOINT.

942,127.  Specification of Letters Patent.  Patented Dec. 7, 1909.

Application filed February 15, 1906. Serial No. 301,233.

*To all whom it may concern:*

Be it known that I, MAX BARSCHALL, a resident of New York city, county, and State, a subject of the King of Saxony, and whose present post-office address is No. 20 Boulevard Carabacel, at Nice, in the Republic of France, have invented new and useful Improvements in Rail-Joints, of which the following is a specification.

My invention relates to rail joints and particularly to that type of rail joints in which a wheel bearing or carrying member is employed to bridge the gap between the ends of the rails. In constructions of this character the difficulty is experienced that the rail tread surface at the joints is widened by the bearing members and differs from the shapes of the tread of new wheels, and worn wheels with a so called false flange.

The object of my present invention is to construct a joint of which the several parts are in rigid connection with each other where they are supported by the sleepers, but admit of a free and independent vertical displacement of the main rail and the bearing member in the space between the two sleepers whereby the irregularities of the tread of the wheel are more or less compensated.

The invention is illustrated on the accompanying drawing in several constructional modifications.

Figure 5:
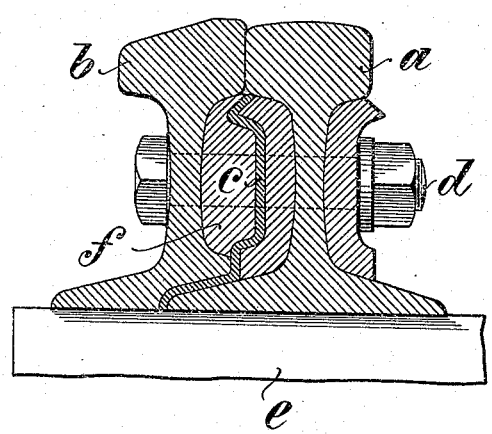
Figure 6:
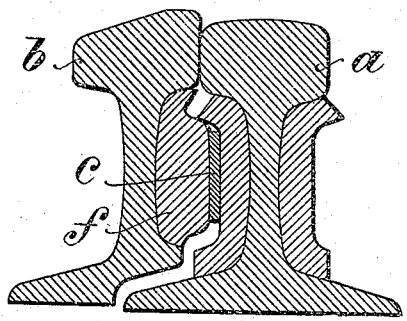
Figure 7:
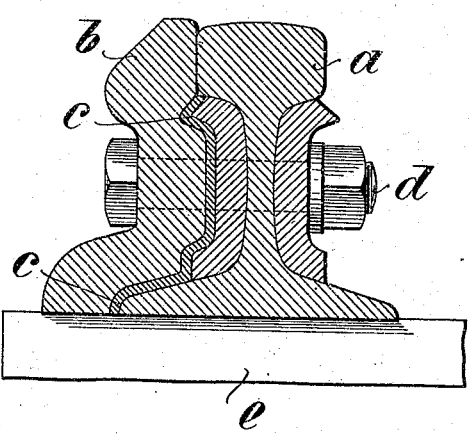
Figure 8:
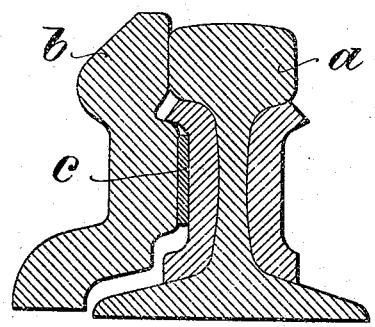

Figure 1 is a section of the joint with a bearing member constructed as a bearing fish rail; Fig. 2 is a section with a bearing member constructed as a bearing fish plate; Fig. 3 is a perspective view of the main rail with the filling piece, the wheel bearing member omitted; Fig. 4 is a plan of the form of joint as shown in section in Fig. 1; Fig. 5 is a section of the joint with differently shaped connecting parts with the parts shown in position over the sleepers; Fig. 6 is a section of the same form of joint in the position between two sleepers; Figs. 7 and 8 show the same sections as 5 and 6 applied to bearing fish plates.

The main rail $a$ is in the usual way fastened to the sleeper $e$ and connected by bolts $d$ with a bearing member which may be constructed as a bearing fish rail, as shown in Figs. 1, 5 and 6, or as a bearing fish plate as shown in Figs. 2, 7 and 8. Between the web of the rail $a$ and the supporting member is a filling piece $g$ which as shown in Fig. 3 is provided with supporting pieces extending at the place where the rails are fastened to the sleepers, to the head of the rail and over the flange of the same, so that over the sleepers all parts of the joint are rigidly connected. Between the sleepers where there is the gap between the ends of the rails, these supporting pieces $c$ of the fillers $g$ are cut away as shown in Fig. 3, so as to admit at this part of the joint free and independent vertical displacement of the main rail and the bearing member. The filler $g$ with the supporting pieces $c$ may be produced in one piece by the rolling process in which case the central portion between the parts which are over the sleepers forming the supporting pieces are cut away, so that as shown in Fig. 3 the filler fills only the vertical space next to the web of the rail.

In the constructional form shown in Fig. 1 the bearing member consists in a bearing fish rail; in such case the space between the filling piece $c$ and the bearing fish rail contains a second filler $f$ over the sleepers to allow a second connection of all parts of the joint. The length of this filler $f$ either equals about the breadth of the sleepers, or the total length of the bearing member.

Figs. 5 and 6 show the bearing fish rail with a varied form of filling pieces $c$ and $f$, Fig. 5 in the position just over the sleeper and in Fig. 6 in the position between two sleepers; this last figure shows the main rail vertically depressed by a new car wheel; under worn wheels the reverse deflection takes place in so far as in that case the bearing member has alone to carry the wheel or more of the wheel than the rail. Figs. 7 and 8 show the same construction of the filling piece $c$ as 5 and 6, applied to bearing fish plates.

What I claim, and desire to secure by Letters Patent of the United States is:—

1. In a rail joint, the combination of a main rail and sleepers, an auxiliary wheel-bearing member disposed to permit yielding of the rail ends in a vertical direction, relatively to said member between the sleepers, but rigidly connected with said rail at both of its ends above the sleepers, a filling piece having enlarged ends of a length substantially equal to the width of said sleepers, and means for rigidly connecting said ends to said rails.

2. In a rail joint, the combination of a main rail and sleepers, of an auxiliary wheel bearing member and a filling piece having enlarged ends of a length substantially equal to the width of said sleepers, as set forth.

3. In a rail joint, the combination of a main rail and sleepers, of an auxiliary wheel bearing member, a filling piece substantially of the length of said auxiliary wheel bearing member, said filling piece having enlarged ends conforming to the space formed by the base, web and head of said main rail, said ends being rigidly connected with said main rail and said auxiliary wheel bearing member, substantially as set forth.

4. In a rail joint, the combination of a main rail and sleepers, of an auxiliary wheel bearing member and filling pieces disposed with their ends substantially over the whole width of the sleepers, said filling pieces conforming on said ends to the space formed by the base, web and head of said main rail and disposed between said main rail and said auxiliary wheel bearing member, the portion of said pieces between the sleepers being of suitable width to allow yielding of the rail ends disposed between the sleepers, substantially as set forth.

5. In a rail joint, the combination of a main rail and sleepers, of a fish rail, a filling piece and a second filling piece between said first filler and said fish rail, said filling piece suitably shaped to permit a yielding connection of the rail ends in a vertical direction between the sleepers, but a rigid connection of said ends above the sleepers.

6. In a rail joint, the combination of a main rail and sleepers, of a fish rail, a filling piece coinciding with the space formed by the base, web and head of said main rail, said filling piece having its ends extending substantially over the width of the sleepers and a second filling piece between said first filling piece and said fish rail, substantially as set forth.

7. In a rail joint, the combination of the main rail with a fish rail as bearing member, a filling piece extending above the sleepers from the outer edge of the head of the main rail to over the flange of the same, and a second filling piece between said first filler and the web of the bearing fish rail, essentially as and for the purpose described.

In testimony whereof I have hereunto set my hand in presence of two subscribing witnesses.

MAX BARSCHALL.

Witnesses:
LOUIS MICHARD,
GEO. B. ORLLO.